June 22, 1954
C. E. BOUCHER
2,681,768
APPARATUS FOR FEEDING GRAIN TO HAMMER MILLS
Filed June 25, 1951
3 Sheets-Sheet 1
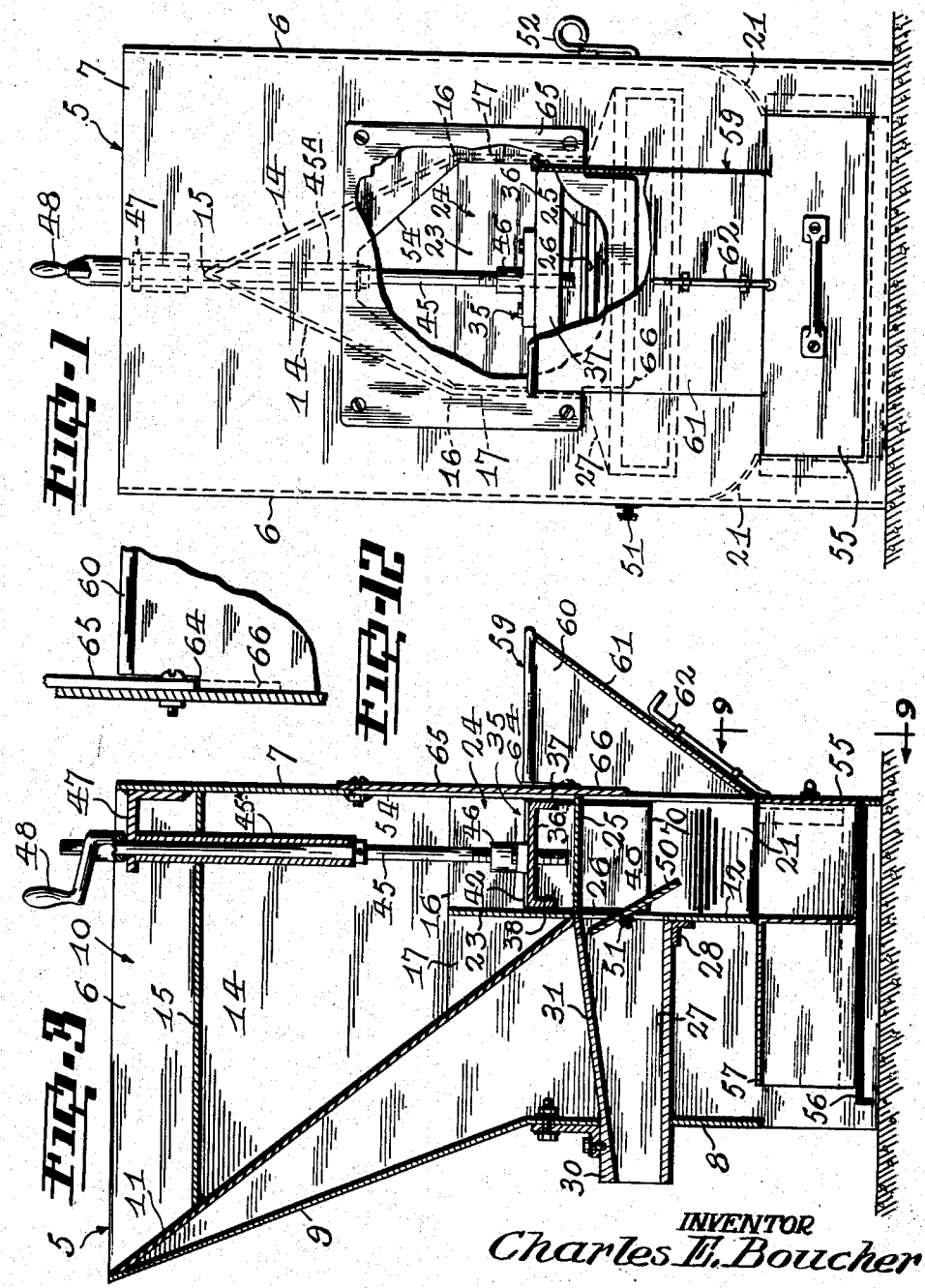
INVENTOR
Charles E. Boucher
BY Featherstonhaugh & Co.
ATTORNEYS June 22, 1954  C. E. BOUCHER  2,681,768
APPARATUS FOR FEEDING GRAIN TO HAMMER MILLS
Filed June 25, 1951  3 Sheets-Sheet 2
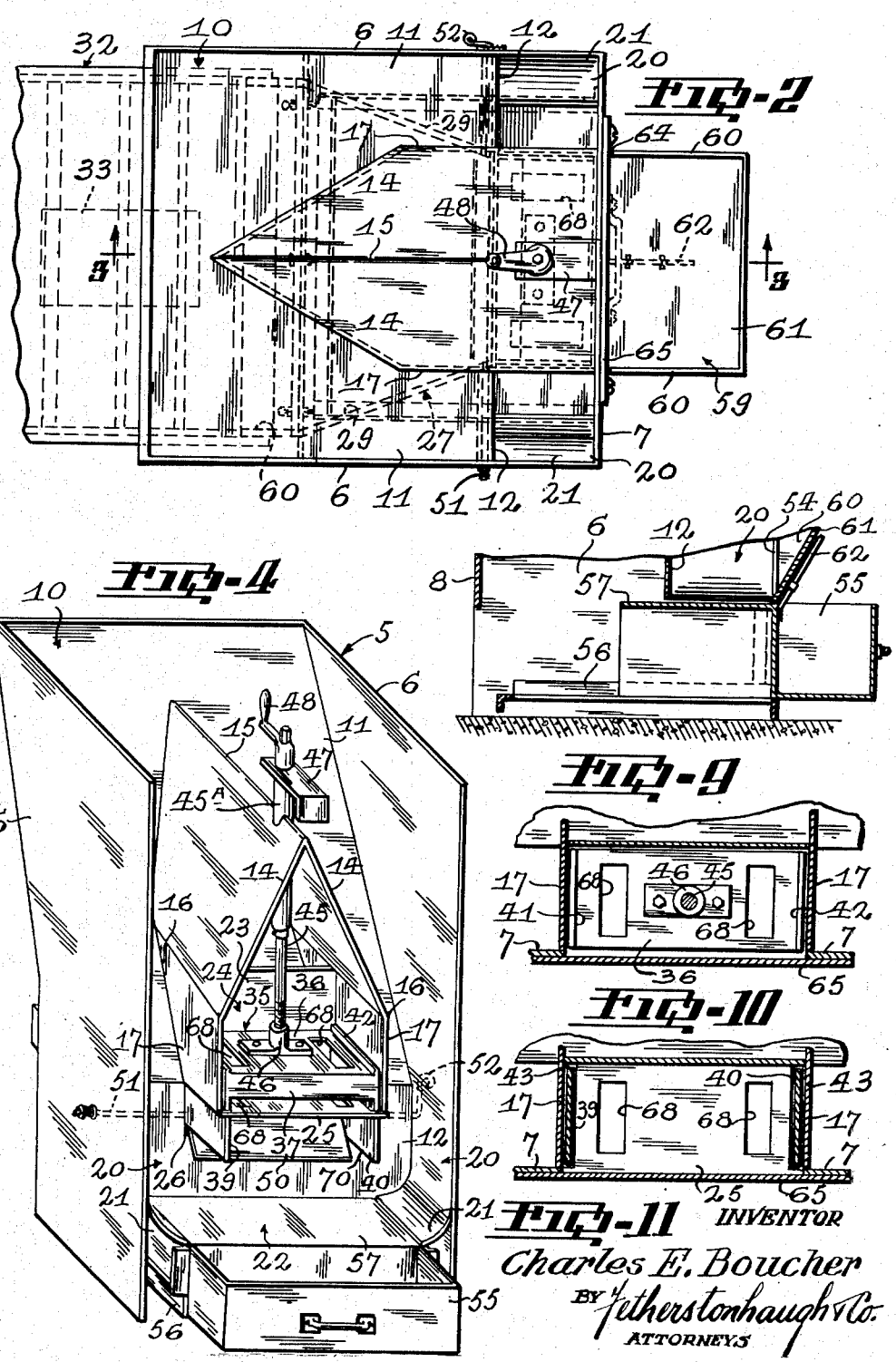
INVENTOR
Charles E. Boucher
BY Fetherstonhaugh & Co.
ATTORNEYS June 22, 1954  C. E. BOUCHER  2,681,768
APPARATUS FOR FEEDING GRAIN TO HAMMER MILLS
Filed June 25, 1951  3 Sheets-Sheet 3
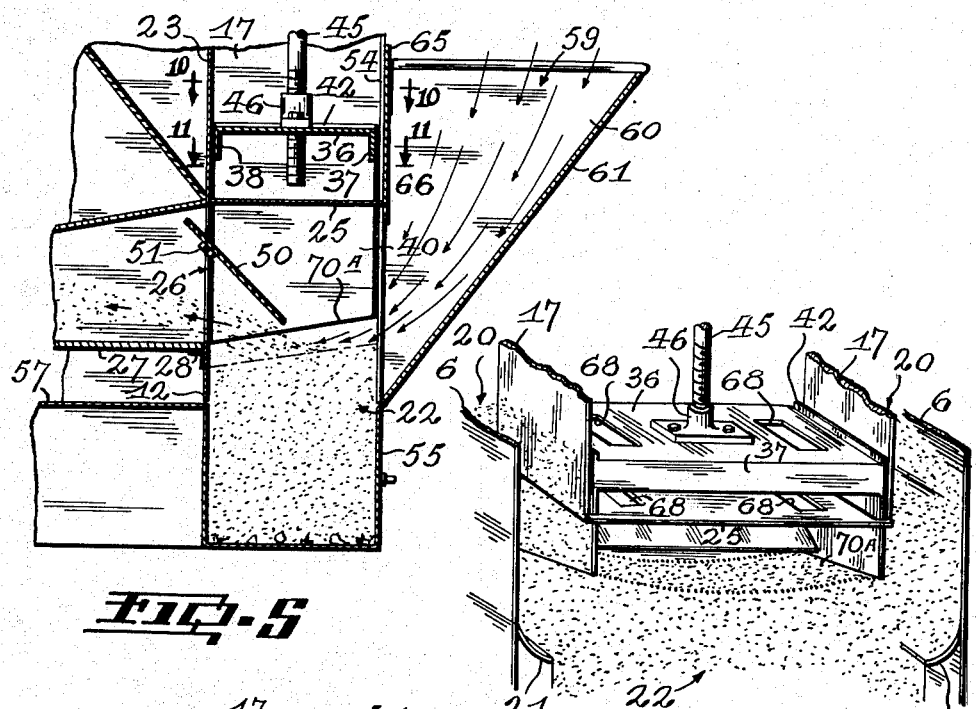
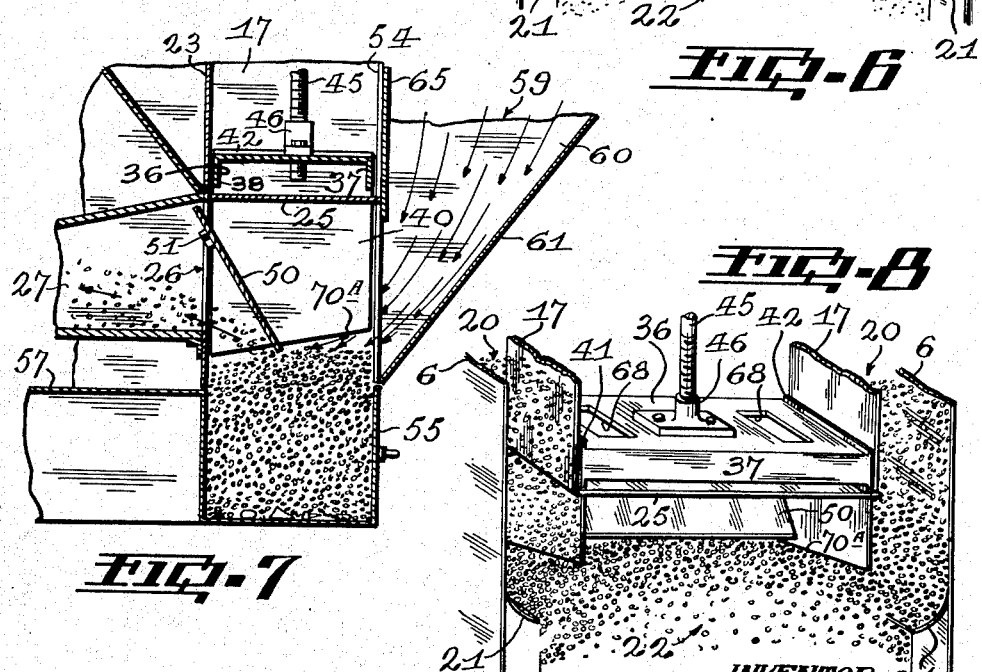
INVENTOR
Charles E. Boucher
BY Fetherstonhaugh & Co.
ATTORNEYS Patented June 22, 1954

2,681,768

UNITED STATES PATENT OFFICE 2,681,768

APPARATUS FOR FEEDING GRAIN TO HAMMER MILLS

Charles Eugene Boucher, Joliette, Quebec, Canada, assignor to S. Vessot Company Limited, Joliette, Quebec, Canada Application June 25, 1951, Serial No. 233,272

14 Claims. (Cl. 241—81)

This invention relates to improvements in grain pulverizing mills of the rotary beater or hammer type, and more particularly to an improved delivery means for feeding grain to a hammermill.

A particular object of this invention is to provide an apparatus for feeding grain to a hammermill on the suction side thereof which consists of a hopper mounted above a grain pit, the latter being connected to the hammermill by a horizontal conduit and novel means for regulating the flow of grain from the hopper to the pit to stabilize the level of the grain in the pit for constant controlled feed of the grain from the pit to the suction side of the hammermill.

Another object is to provide a removable receptacle in the pit designed to entrap any foreign particles carried in the flow of grain to prevent their introduction into the hammermill chamber.

A further object is to provide a novel arrangement for directing the grain flow to the pit so as to ensure that any foreign particles carried by the grain will be directed to a receptacle therefor along paths remote from the hammermill inlet.

A still further object is to provide novel means for inducing a forced draft whereby the particles of grain are impelled from the grain pit to the hammermill conduit.

The above and other objects and characteristic features of this invention will be understood more readily from the following detailed description taken in connection with the accompanying drawings, in which:

Fig. 1 is a front elevational view, partly broken away, of a grain feed apparatus embodying my invention.

Fig. 2 is a top plan view of the apparatus shown in Fig. 1.

Fig. 3 is a vertical sectional view taken along the lines 3—3 of Fig. 2.

Fig. 4 is a perspective view with the front wall removed to reveal certain assembled parts of the apparatus.

Fig. 5 is a fragmentary sectional view of a modified form of the apparatus.

Fig. 6 is a fragmentary perspective view of the apparatus shown in Fig. 5.

Fig. 7 is a view similar to Fig. 5, but showing certain parts in another position.

Fig. 8 is a perspective view of the apparatus shown in Fig. 7.

Fig. 9 is a sectional detail view taken along the lines 9—9 of Fig. 3.

Fig. 10 is a sectional view taken along the lines 10—10 of Fig. 5.

Fig. 11 is a sectional view taken along the lines 11—11 of Fig. 5.

Referring more particularly to the drawings, 5 generally indicates a housing for a grain feeding apparatus comprising vertical side and front walls 6 and 7 and a rear wall including a vertical lower section 8 and an outwardly inclined upper section 9. The upper portion of housing 5 contains a hopper 10 defined by side and front walls 6 and 7 and an inclined wall 11 sloping inwardly from the upper edge of rear wall section 9 to the upper edge of an intermediate vertical wall 12 paralleling the front wall 7. Hopper 10 is centrally divided by baffle walls 14 extending from front wall 7 to rear wall 11. Each baffle wall 14 slopes from a central apex 15, located below the upper edge of the hopper, toward an adjacent side wall 6 with the lower edge terminating at 16, located a predetermined distance from adjacent side wall 6 and the upper edge of vertical wall 12. Vertical walls 17 extend down from the lower edge 16 of baffle walls in spaced parallel relation to adjacent side walls 6 to a predetermined distance above the bottom of housing 5. Walls 17 are joined along their forward edges to the front wall 7 and along their rearward edges to the lower portion of hopper end wall 11 to meet the upper edge of intermediate vertical wall 12.

The baffle walls 14 direct the grain toward opposite sides of the hopper and into spaced vertical passageways 20 defined by the side and front walls 6 and 7, intermediate wall 12 and vertical wall 17. The lower end of each passage way 20 is provided with an incurved extension plate 21 from the side wall 6 which directs the grain to a central pit 22, the grain passing under the lower edge of vertical wall 17.

A plate 23 extends vertically from the upper edge of intermediate wall 12 between vertical walls 17 which conjointly define a housing 24 closed at the bottom by a plate 25 extending from the upper end of intermediate wall 12 to front wall 7. An elongated opening 26 is provided in wall 12 directly beneath plate 25. Opening 26 is of a relatively shallow depth to permit a substantial buildup of grain in the pit 22 below the opening 26. The apparatus is provided with a horizontal grain conduit 27 having its inner end supported on a bracket 28 to surround the opening 26. The side walls 29 of conduit 27 are outwardly flared as indicated in Fig. 2 to a nozzle 30 projecting through an opening in the lower section 8 of the housing rear wall. The conduit top wall 31 tapers toward nozzle 30 (see Fig. 3). Nozzle 30 has an opening substantially equal to the opening 26 in capacity to reduce friction to a minimum, but is of substantially greater width and is proportionately shallower in depth so as to spread the grain over a wide area as it is fed to a hammermill, generally indicated at 32, when connected to the nozzle 30 (see Fig. 2).

Housing 24 is provided with a grain feed regulator, generally indicated at 35, and comprising a horizontal plate 36 having depending front and rear flanges 37 and 38 and elongated vertical side plates 39 and 40 which project a substantial distance below plate 36 with short marginal upper portions 41 and 42 projecting above the upper surface of plate 36. Side plates 39 and 40 are disposed against the inner surfaces of the adjacent side walls 17 of housing 24 and project through slots 43 (see Fig. 11) in the housing bottom plate 25 so as to be disposed on opposite sides of the inlet opening 26 of conduit 27. Regulator 35 moves vertically in housing 24 by an elevating mechanism comprising a shaft 45 having its lower end screw threaded through a collar 46 secured to plate 36. The upper end of shaft 45 which extends through a sleeve 45a in baffle walls 14 is stabilized by a bracket 47 carried by front wall 7. A crank handle 48 rotates shaft 45 causing the collar 46 to ride along the threaded portion of shaft 45 to thereby vertically adjust the grain regulator 35 to any desired position.

A butterfly valve 50 extends across opening 26 and is swingable about a horizontal axis provided by a shaft 51 having a handle 52 beyond one side wall 6 by means of which the valve is adjusted.

The front wall 7 of housing 5 is provided with an opening 54 extending substantially from the base to a point above the upper end of housing 24. The bottom portion of opening 54 is of substantially greater width than the remaining portion, thereabove to receive a drawer 55 which is slidable on tracks 56 and forms a retractable bottom for pit 22. Drawer 55 has a rearwardly extending platform 57 which normally projects beyond pit 22 when the drawer is in its closed position and which serves as a cut-off to retain the grain above the drawer level when the latter is pulled out. Above the drawer level, opening 54 is of a width substantially equal to the width of housing 24, its side edges extending vertically to the height of housing 24 and then being directed upwardly and inwardly to provide a sufficient opening above the housing for easy access to the grain regulator elevating mechanism. An air duct 59 defined by vertical side walls 60 and an inclined front wall 61 is secured to front wall 7 over opening 54 above the drawer and is provided with a sliding latch bar 62 on front wall 61 for retaining drawer 55 in its closed position. The upper edge of the air duct is disposed above the level of the housing bottom plate 25 and is slotted at 64 adjacent the housing front wall 7 so the lower portion of a cover plate 65, which is secured over the upper section of opening 54 is received in the slots 64. The plate 65 is provided with a lower marginal projection 66 which extends for a substantial distance below housing plate 25 and between the side walls 60 of the air duct as a baffle for air currents from the duct to the grain pit.

Both of the plates 25 and 36 are provided with openings 68 which permit air to circulate so as to prevent accumulation of grain dust which would otherwise collect and prevent manipulation of the regulator. The upper marginal portions 41 and 42 of side plates 39 and 40 assist in preventing dust from falling between adjacent surfaces of the side plates 39 and 40 and side walls 17 of the housing.

In operation, the grain which is fed to the hopper 10 is directed by baffle walls 14 to passageways 20 at either side of the apparatus and thence to pit 22. The grain is permitted to build up in pit 22 to a level predetermined by the adjustment of regulator 35. This predetermined level is in the proximity of the inlet opening 26 to conduit 27. The conduit is connected at its nozzle end 30 in conventional or any other desired manner to a hammermill 32 on the suction side of a fan or blower, designated 33, by means of which the grain is delivered to the hammermill. The level of the grain in pit 22 will be determined by the type of grain employed so as to continuously supply grain to the hammermill at a uniform rate of speed.

The suction through conduit 27 causes a current of air to be drawn through duct 59 and across the level of the grain in pit 22. This may be assisted by angular adjustment of butterfly valve 50 to increase or modify the air current so that the upper layer of grain is drawn into the conduit from the pit. As the top layer of grain is carried off the grain from the hopper is fed beneath the bottom edges of side plates 39 and 40 of regulator 35 to maintain the predetermined level in the pit. Once the grain has started to flow to the hammermill the operator can adjust the feed thereto by manipulating the regulator to obtain uniform feed equal to the maximum capacity of the hammermill without overloading.

If the grain particles are heavy the butterfly valve will be moved towards a closed position to increase the draft force sufficient only to move or lift the upper layer of heavier grain from the pit. However, in the case of light weight grain particles the draft force may be suitably modified by moving the butterfly valve away from the conduit opening so that only the top layer of light weight grain particles will be carried to the hammermill. With an apparatus according to my invention the operator is assured that, by proper adjustment of the regulator 35 and the butterfly valve 50, only the grain particles up to a maximum desired weight will be carried to the hammermill. The heavier grain particles and other foreign matter will remain in the pit 22. It is well known that grain as it is shipped frequently contains such foreign objects as wood, nails, nuts and bolts.

In the feeding of grain to a hammermill by certain conventional apparatus, these foreign objects are delivered to the hammermill with the grain and cause a great deal of destruction thereto. In providing a feeding apparatus according to my invention the delivery of these foreign objects to the hammermill is completely eliminated. In the first place the grain is delivered by indirect paths to the pit in such a way that foreign particles heavier than the grain, will tend to work their way toward the bottom of the pit along the sides of the apparatus rather than passing directly in front of the conduit opening 26 through which the grain is fed to the hammermill. This reduces any hazard of the foreign particles being picked up by the forced draft in front of the conduit opening. Secondly, the side plates of the regulator 35 serve as baffle walls which permit only replacement quantities of grain to flow therebeneath to a position of delivery in front of the conduit opening as the upper layer in the pit is being carried off into the conduit.

As previously stated drawer 55 is located at the bottom of the grain pit and it is into this drawer that the heavy foreign objects are deposited. When the mill is in operation the drawer is normally secured in place by the latch bar 62. The drawer may be withdrawn at any time to remove the foreign objects by raising the latch bar. When the drawer is withdrawn platform 57 serves as a cut-off to hold the grain above the drawer level so as to facilitate closing of the drawer.

In Figs. 1 to 4 I have shown an apparatus provided with a grain feed regulator in which the side plates 39 and 40 are provided with substantially horizontally disposed lower edges 70. This permits an even distribution of a top layer of grain over a substantially wide area from front to rear of the pit.

A modified form of the grain feed regulator is illustrated in Figs. 5 to 8 inclusive. The regulator side plates 39 and 40 are provided with lower edges 70a which are inclined from front to rear with the maximum length of the plates being adjacent the conduit opening 26. With this arrangement the grain level diminishes from front to rear with the mean level at approximately half way therebetween. Thus the air currents tend to pick-up the grain nearest the front of the pit and carry it over the rear portion to the hammermill feed conduit. It has been found that an accurate regulation of the grain feed can be attained more rapidly with the modified feed regulator and that it is more readily adaptable for grains of different weights.

In Figs. 5 and 6 I have illustrated the manner of regulating the feed of light weight grain to the pit in front of feed conduit 26. As the grain flows under the side plates 39 and 40 it tends to flow in a horizontal direction to fill the void created by the forced draft removal of grain. However, the rate of flow is naturally diminished by friction and in the case of a light weight grain the lateral flow will be rapidly diminished so that the top layer will have a concave contour. Because of the inclined bottom edges 70a of the side plates 39 and 40 the lowest point of the grain surface will be at a central point adjacent wall 12 defining the rear wall of pit 22. It is particularly desirous to maintain the grain at a suitable level where the grain will not build up directly in front of opening 26 above the floor level of the conduit 27. In order to ensure this, regulator side plates 39 and 40 are adjusted so that lowest point of their inclined lower edges 70a are approximately at a floor level of conduit 27. Thus the light grain between plates 39 and 40 will be at floor level of conduit 27 adjacent plates 39 and 40 directly in front of opening 26 and below that level adjacent opening 26 in the centre. However, the level rises toward the front of the pit. In Fig. 5 I have indicated by broken line the slope from rear to front of the pit at the centre. From this it will be seen that the mean level at the centre is at about floor level of conduit 27. The current of air tends to pick up the top layer of grain and carry it to conduit 27. The maximum current is however in the centre and tends to lift the greatest quantity at this point with the air current forces diminishing toward opposite sides. Due to the convex surface of the grain compensation is made for the varying air current forces so that the flow of grain is evenly distributed across the mouth of the conduit 27. As the force of the air current need only be sufficient to lift light grain particles, this force can be diminished by opening butterfly valve 50.

In Figs. 7 and 8 I have illustrated the manner of regulating the apparatus to accommodate the feed of heavier grain particles. As the lateral movement of the heavier grain particles is not so readily diminished by friction, the heavier grain particles tend to pyramid toward the centre of the pit between the regulator side plates 39 and 40 resulting in a convex contour to the upper surface of the grain in pit 22. This calls for a lowering of the regulator to ensure that the grain at the rear of the pit will not be spilled through the opening 26 and into conduit 27 without air current control of same. As the air current force is greatest at the centre the most of the grain fed into conduit 27 will come from the centre of the pile. However, as the heavier grain particles are substantially looser they will disperse more readily across the width of the conduit 27. With the increase of the weight of the grain particles it is necessary to increase the force of the air current to lift the particles from the pit into the conduit. This is accomplished by regulating the butterfly valve 50 towards its closed position.

The embodiments of the invention in which an exclusive property or privilege is claimed are defined as follows:

1. Apparatus for feeding grain to a hammermill comprising a hopper into which grain is introduced, a grain pit below said hopper, said pit being provided with a side opening spaced substantially above the floor level of said pit, a horizontal grain conduit extending from said side opening to said hammermill and in communication therewith, baffle walls positioned within said hopper having their upper portions tapering to meet at a point above said side opening and their lower portions extending downwardly a predetermined distance on either side of said side opening and in spaced relation to opposing sides of said hopper to provide side passageways at either side of said opening directly communicating with said hopper and said pit so as to by-pass said side opening, and a grain feed regulator mounted over said opening between said passageways, said regulator including a side wall extension adjacent the lower end of each baffle and adjustable relative to said baffle and adapted to regulate the flow of grain from the passageways to the pit to provide a predetermined level of the grain in the pit in relation to the side opening for feeding said grain to the conduit.

2. Apparatus as set forth in claim 1, including a drawer slidably fitted in the bottom of said pit for the deposit of foreign particles carried with the grain, said drawer being removable for the separation of the foreign particles from the grain.

3. Apparatus as set forth in claim 2, including a cut-off member carried by said drawer and adapted to retain the grain in the pit at its normal level when said drawer is slidably removed from the pit.

4. Apparatus for feeding grain to a hammermill comprising a hopper into which grain is introduced, a grain pit below said hopper, said pit being provided with a side opening spaced substantially above the floor level of said pit, a grain feed regulator housing centrally mounted in said pit above said side opening, baffle walls positioned within said hopper having their upper portions tapering to meet at a point above said side opening and their lower portions extending downwardly a predetermined distance on either side of said side opening and in spaced relation to opposing sides of said hopper to provide a passageway at either side of said regulator and communicating with said hopper and said pit so as to by-pass said side opening, a horizontal grain conduit from said hammermill to the side opening in said pit, and means mounted in said sleeve for regulating a lateral flow of grain from said passageways to said pit to a level in relation to said side opening calculated to provide a constant feed of grain to said conduit.

5. Apparatus as set forth in claim 4 in which said regulating means comprises a pair of side wall members mounted for vertical adjustment relative to said housing, said side wall members having their lower extremities projecting below said housing to limit the lateral flow of grain from said passageways to the central portion of the pit to a point predetermined by the vertical adjustment of the side wall members.

6. Apparatus as set forth in claim 5, in which said housing is defined by vertical front, side and rear walls and a bottom closure, said bottom closure being provided with openings adjacent its side walls to receive said vertically adjustable side wall members.

7. Apparatus as set forth in claim 4, in which said conduit is connected to the suction side of said hammermill and means for impelling the grain from the pit to the intake of the conduit including an air duct mounted on said apparatus and communicating with a side opening to said pit opposite the intake of said conduit whereby air currents from said duct are directed to the surface grain in said pit with a force sufficient to impel said grain to the intake of said conduit.

8. Apparatus as set forth in claim 7, including a baffle adjustably mounted to swing about a horizontal axis intermediate the height of said side opening at the intake of said conduit to control the force of the air currents from said air duct.

9. Apparatus as set forth in claim 4, in which said housing is defined by vertical front, side and rear walls and a bottom closure provided with slots adjacent said side walls, and said regulating means comprises a plate member extending transversely of said housing, a pair of side wall members depending from said plate member for vertical sliding movement in the slots of said housing bottom closure, and means engaging said plate member and operable for vertical movement of said plate member relative to the housing to position the lower edges of the side wall members to predetermined levels in the pit relative to the side walls of said housing.

10. Apparatus as set forth in claim 9, including extensions from the upper edge of said side wall members projecting vertically beyond the transverse plate member, said extensions serving to prevent deposits of foreign matter between the adjacent surfaces of the housing side walls and the regulator side wall members.

11. Apparatus as set forth in claim 9, in which said regulator plate and said housing bottom closure are provided with corresponding openings through which air is circulated to prevent accumulation of foreign matter on the upper surfaces of said plate and closure.

12. Apparatus as set forth in claim 5, in which the lower edges of said regulator side wall members are disposed in a horizontal plane to equalize the distribution of the grain from the mouth of the conduit to the remote side of the pit, and an air duct in said remote side of the pit affording a forced draft directed to the grain surface for impelling the grain to said conduit.

13. Apparatus as set forth in claim 5, in which the lower edges of said regulator side wall members are inclined toward the conduit side of the pit to provide an upward slope to the surface of the grain from the conduit side of the pit to the opposite side, and an air duct in said opposite side of the pit adapted to direct a forced draft against the sloping surface of the grain with its maximum force directed to the grain at the upper side of the slope and its minimum force directed to the grain at the lower side.

14. Apparatus as set forth in claim 4, in which the lower portions of said baffle walls define the opposing side walls of said housing and in which said tapering upper portions provide a top closure for said housing serving to direct the downward flow of grain from the hopper to the passageways on opposite sides of the housing.

References Cited in the file of this patent

UNITED STATES PATENTS

| Number | Name | Date |
|---|---|---|
| 1,272,311 | Plaisted | July 9, 1918 |
| 1,306,775 | Roberts | June 17, 1919 |
| 1,376,190 | Dean | Apr. 26, 1921 |
| 1,418,866 | Dennig | June 6, 1922 |

FOREIGN PATENTS

| Number | Country | Date |
|---|---|---|
| 258,579 | Germany | May 20, 1922 |
| 692,601 | Germany | June 22, 1940 |